J. MILLER.
Seed-Planter.
No. 55,142. Patented May 29. 1866.
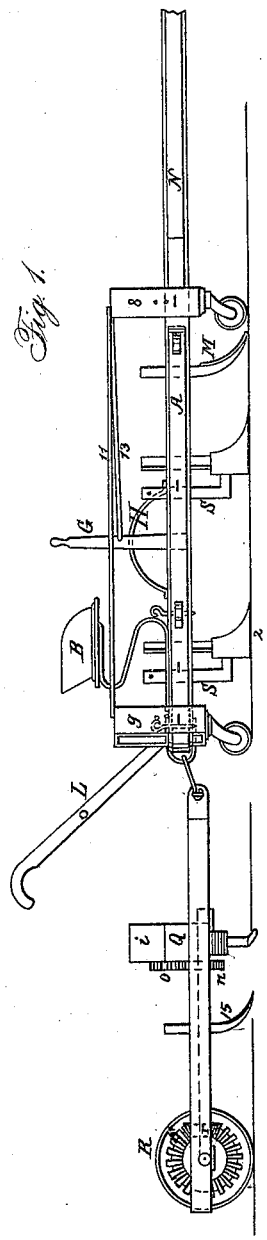
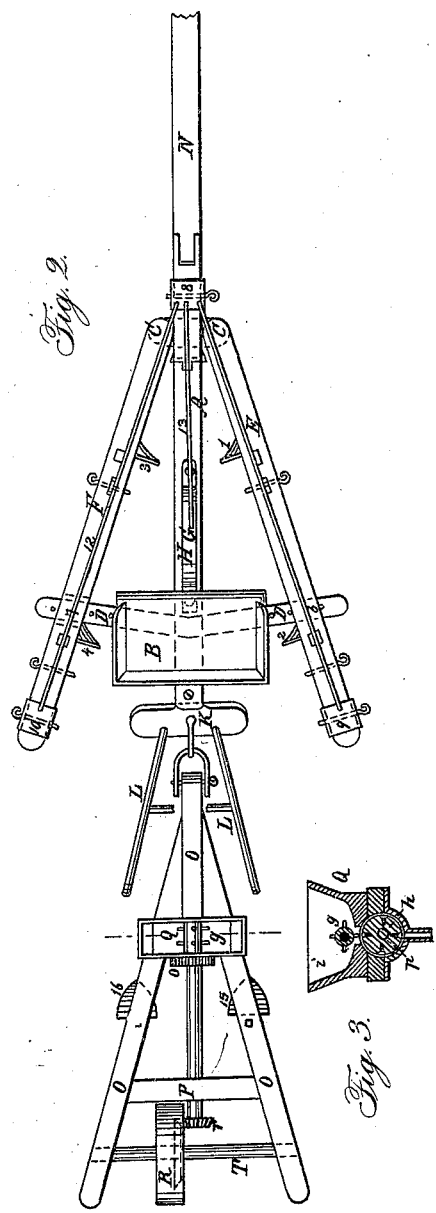
Witnesses:
J. J. Peyton
Theodore Lang
Inventor:
John Miller
By Baldwin & Son
Attys

UNITED STATES PATENT OFFICE.

JOHN MILLER, OF RUSSELLVILLE, KENTUCKY.

IMPROVEMENT IN SEEDER AND CULTIVATOR COMBINED.

Specification forming part of Letters Patent No. 55,142, dated May 29, 1866.

*To all whom it may concern:*

Be it known that I, JOHN MILLER, of Russellville, in the county of Logan and State of Kentucky, have invented a new and useful Improvement in a Combined Cultivator and Planter; and I do hereby declare that the following is a full, clear, and exact description of the construction and operation of the same, reference being had to the annexed drawings, making a part of this specification, in which—

Figure 1 is a view, in side elevation, of my cultivator and planter. Fig. 2 is a top view of the same; and Fig. 3 is a section on the line *x x* of Fig. 2, through the seed-box.

It is the object of my invention to economize labor by furrowing the land and ridging it for planting and to sow and cover the seed all at one operation; and to this end my invention consists in the combination of a cultivator which can furrow and form the ridge with a planter and coverer that will plant and cover the seed and leave the ridge smoothly rolled.

To carry out the objects of my invention a beam, A, of suitable strength, carries a driver's seat, B, at its rear, and is mortised to receive cross-braces C and D, the former having pivoted at one end a bar, E, and at the other a bar, F, to support cultivators or plows 1 2 3 4, the bars being properly mortised to slide on the brace D, the brace and bars having holes to receive pins 6 and 7, to adjust the bars at varying distances from the beam A.

The beam A is supported at its front end, and the bars E and F at their rear ends, on casters swiveled in brackets 8, 9, and 10, the bracket 8 being pivoted to the beam, and 9 and 10 to the bars, each of the brackets having holes at varying distances apart to adjust the beam and bars at the height from the ground desired, the brackets 9 and 10 being also connected by rods 11 and 12 to the bracket 8, and this bracket is connected by a rod, 13, with a lever, G, near the driver's seat, having its fulcrum on the beam. A segment, H, on the beam carries notches to support the lever G in the position desired, and by pushing the lever forward it is evident that the beam and bars will be depressed to run nearer the ground, and that the depth of plowing can thus be varied at the pleasure of the driver.

The plows 1, 2, 3, and 4 have each a rear brace-bar, *s*, secured rigidly to the landside, and passing through mortises in the bars E and F. The braces *s* are adjustable by means of holes at different distances and a pin passing through the bars and braces, and thus the plows can be set deeper or shallower at pleasure.

A cross-bar, K, at the rear end of the beam A, serves to receive plow-handles L, when the cultivator is used alone; and near its forward end the beam A carries a colter or bull-tongue, M, to open the furrow, and has a flexible tongue, N, attached to its front end, for the team.

I now construct a triangular frame, O, of three pieces, secured near its front end together, and by a cross-brace, P, near its rear end. This frame carries a seed-planter, Q, and a coverer, R, the coverer consisting of a broad roller having a miter-gear wheel, S, and being fixed on a shaft, T, free to revolve in its bearings. The miter-gear S couples with a pinion, *r*, on a longitudinal shaft, *p*, secured in proper bearings.

The shaft *p* carries a spur-gear, *n*, near its forward end, that gears with a spur-pinion, *o*, on the stirrer *g* of the planter Q, and the forward end of the shaft *p* has a feed-roller, *h*, secured to and revolving with it, the stirrer and feed-roller being within the hopper *i*.

A clevis in the rear of the cultivator and one in front of the planter serves to couple them together, though other modes of coupling may be substituted without affecting the spirit of my invention.

In the rear of the planter I place two shovel-plows, 15 and 16, to throw the earth back to the ridge after the seed has been deposited in the ground.

The operation is as follows: The cultivator and planter being coupled together and the hopper filled, as the machine is advanced by the team the colter M forms a furrow, to which the plows 1, 2, 3, and 4 form a ridge depressed in the center, and the driver, by moving the lever G, can regulate the depth of plowing, and of course the height of the ridge, at pleasure, while its width is determined by the position of the bars E and F, which can be varied as desired. The rotation of the covering-roller rotates the stirrer and feed-roller, and the seed are deposited in greater or less quantity in the furrow formed by the colter by simply raising or depressing the screws in the chambers in the feed-roller, for as the screws are depressed these chambers will contain more seed, and vice versa. As the seed are deposited the shovel-plows in rear of the feed-roller throw the earth toward the furrow and cover the seed, the depth of covering being determined by the position of the shovel-plows. Then the roller passes over the top of the ridge, pressing the earth upon the seed and leaving the ridge smooth and level and well pulverized.

It is manifest that either the cultivator or planter may be used separately when desired.

What I claim as my invention, and desire to secure by Letters Patent, is—

The combination of a cultivator which furrows and forms the ridge with a planter that plants, covers, and finishes the ridge with a smooth flat surface all in once passing over the ground, substantially as set forth.

In testimony whereof I have hereunto subscribed my name.

JOHN MILLER.

Witnesses:
EDM. F. BROWN,
J. I. PEYTON.